United States Patent [19]

Saegusa et al.

[11] Patent Number: 4,864,599
[45] Date of Patent: Sep. 5, 1989

[54] REGISTRATION OF A NEW CORDLESS TELEPHONE TO AN EXISTING SYSTEM

[75] Inventors: Noboru Saegusa; Yukihiro Shimura, both of Tokyo, Japan

[73] Assignee: NEC Corporation, Tokyo, Japan

[21] Appl. No.: 227,024

[22] Filed: Jul. 29, 1988

[30] Foreign Application Priority Data

Jul. 31, 1987 [JP] Japan ................................ 62-190117
Nov. 16, 1987 [JP] Japan ................................ 62-287228

[51] Int. Cl.$^4$ .......................................... H04M 11/00
[52] U.S. Cl. ...................................... 379/61; 379/58; 379/62
[58] Field of Search ...................................... 379/58–63

[56] References Cited

U.S. PATENT DOCUMENTS 4,748,655  5/1988  Thrower et al. ...................... 379/60
4,775,999  10/1988  Williams .............................. 379/59

FOREIGN PATENT DOCUMENTS 0207740  12/1983  Japan ........................................ 379/58

Primary Examiner—Jin F. Ng
Assistant Examiner—David H. Kim
Attorney, Agent, or Firm—Sughrue, Mion, Zinn, Macpeak & Seas

[57] ABSTRACT

A new cordless telephone is registered to an existing cordless telephone system by transmitting the product identification number of the new cordless telephone from the access unit of the system to the new cordless telephone, receiving the transmitted product identification number at the new cordless telephone and verifying that the transmitted product identification number is correctly received. In response to the verification, the system and telephone identification numbers of the new cordless telephone are transmitted from the access unit to the new cordless telephone and stored into an electrically erasable programmable read-only memory of this telephone to be used for establishing calls.

6 Claims, 5 Drawing Sheets

REGISTRATION OF A NEW CORDLESS TELEPHONE TO AN EXISTING SYSTEM

BACKGROUND OF THE INVENTION

The present invention relates generally to cordless telephone systems which are connected to a switched telephone network and, in particular, to registration of a new cordless telephone to an existing cordless telephone system.

Cordless telephone systems comprise an access unit which is connected through a subscriber loop to a switched telephone network and a plurality of cordless telephones. A two-way radio channel is established between the access unit and each cordless telephone by transmitting the system identification number of the system from a transmit end and verifying at a receive end that the transmitted system identification number is identical to that of the own system. This verification operation is necessary to avoid interference which might occur between cordless telephone systems which cover adjacent service areas. A system identification number is assigned to each system at the shipment from the factory by storing such number into the read-only memory of the access unit and into the read-only memory of each of the associated cordless telephones. When a new cordless telephone is to be added to an existing system, the new telephone must be provided with a read-only memory in which the same system identification number is stored. Such read-only memories are currently prepared by the manufacturer in advance for future system expansion or prepared by a servicing company on a per demand basis. This adds to the total manufacturing cost of the system.

SUMMARY OF THE INVENTION

It is therefore an object of the present invention to reduce the total manufacturing cost of a cordless telephone system by eliminating the need to prepare a read-only memory for future system expansion. The present invention is based on the utilization of a product identification, or "serial" number which is uniquely assigned to each cordless telephone at the stage of manufacture and the utilization of a memory of the type which allows data to be electrically written and permanently stored. A typical example of such a memory is the electrically erasable programmable read-only memory, or EEPROM. In accordance with this invention, a new cordless telephone is registered to an existing cordless telephone system by transmitting the product identification number of the new cordless telephone from the access unit of the system to the new cordless telephone, receiving the transmitted product identification number at the new cordless telephone and verifying that the transmitted product identification number is correctly received. In response to the verification, the system and telephone identification numbers of the new cordless telephone are transmitted from the access unit and to the new cordless telephone and permanently stored in a memory of this telephone to be used for establishing calls. Alternatively, the product and telephone identification numbers of the new cordless telephone are transmitted from one of the existing cordless telephones to the access unit to be relayed to the new cordless telephone. This alternative approach eliminates the need to visit the site of the access unit by a servicing personnel by remotely controlling the access unit with the information transmitted from the existing cordless telephone.

BRIEF DESCRIPTION OF THE DRAWINGS

The present invention will be described in further detail with reference to the accompanying drawings, in which.

DETAILED DESCRIPTION

Figure 1:
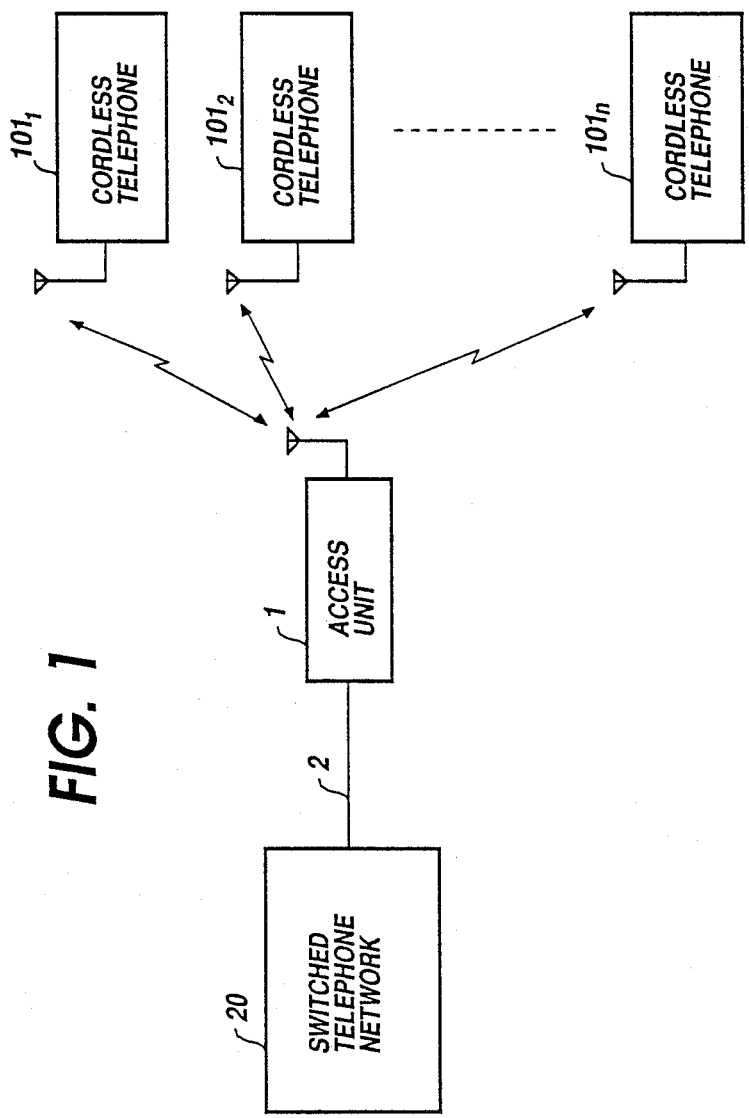
FIG. 1 is a block diagram of a cordless telephone system embodying the present invention.
Figure 2:
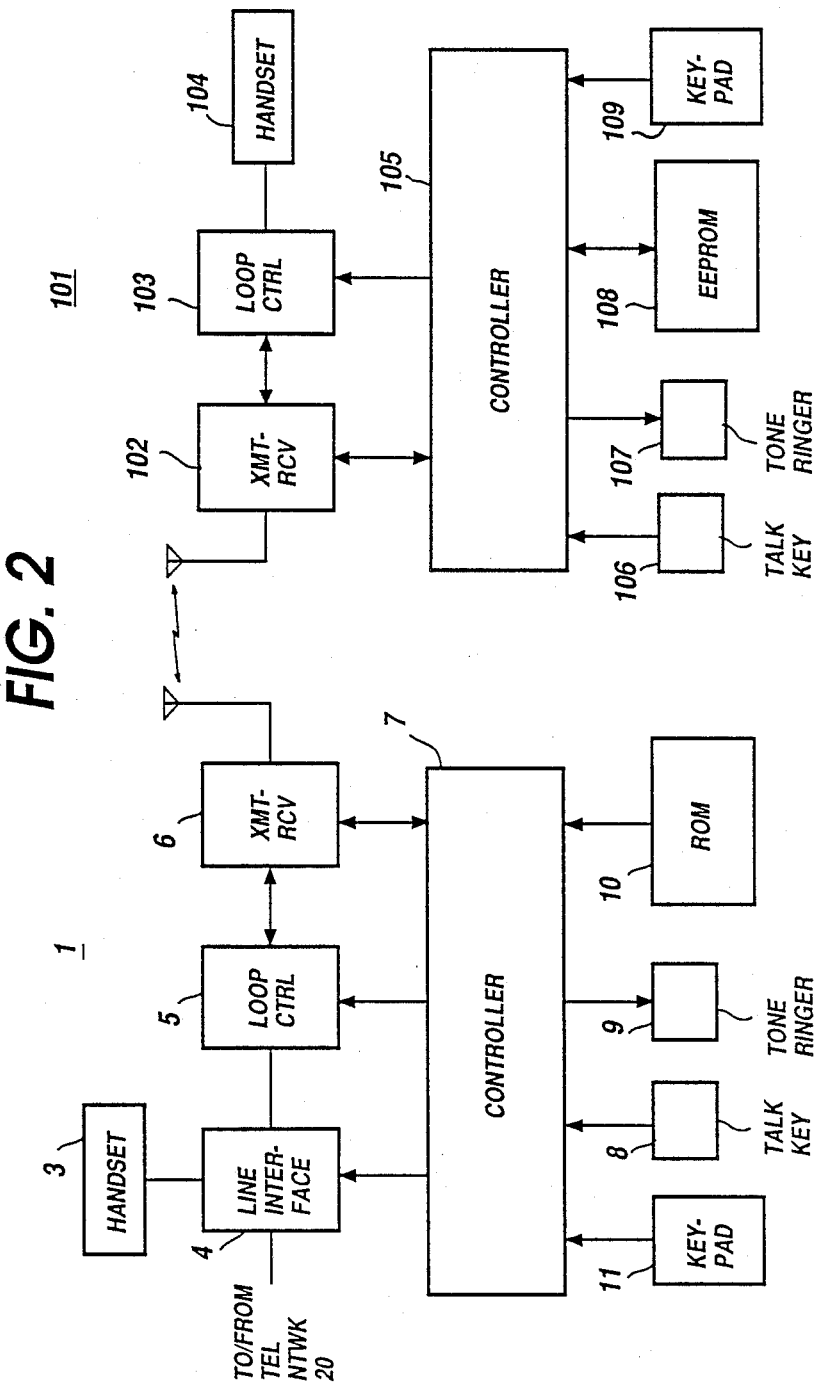
FIG. 2 is an illustration of details of the system of FIG. 1.

In FIG. 1, a plurality of portable cordless telephones $101_1$ to $101_n$ form a cordless telephone system with a radio access unit 1 which is connected through a subscriber loop 2 to a line terminal of a switched telephone network 20. The cordless telephone system is assigned a unique system identification number to distinguish it from other cordless telephone systems. Each of the cordless telephones 101 has a product identification number which is unique to it and no other cordless telephones of the same product type have the same number and a telephone identification number which is unique to it only in the own cordless telephone system. As shown in FIG. 2, access unit 1 is a main telephone of the cordless telephone system and operates as an interface for manually completing incoming calls from the telephone network 20 to one of the cordless telephones 101 with the aid of an attendant personnel in a manner similar to conventional key telephone systems and for automatically relaying dialled information of an outgoing call to the telephone network or establishing an intercom call between cordless telephones of the same system. Access unit 1 includes a line interface circuit 3 coupled to the telephone network 2 via the subscriber loop 2, a handset 4 coupled to the line interface circuit 3, a loop control circuit 5, a transmit/receive unit 6 which selectively establishes a two-way radio channel with any of the cordless portable telephones 101. A controller 7 is provided for controlling the line interface circuit 3, loop control circuit 5 and transmit/receive unit 6 in response to a ringing signal from the network 20 or in response to an off-hook signal received from the cordless telephones 101 and further in response to a signal from a talk key 8 and a numeric key pad 11 when originating an outgoing call from the access unit or forwarding an incoming call from the network to the cordless telephones. The system identification number is stored in a read-only memory 10, which is addressed by the controller 7 whenever an off-hook signal is received from a cordless telephone to check the stored system identification number against one sent from the cordless telephone to verify that it belongs to the own cordless telephone system.

Each portable telephone 101 comprises a transmit/receive unit 102, a loop control circuit 103, a handset 104, a controller 105, a talk key 106, a tone ringer 107 and an electrically erasable programmable read-only memory 108 which stores the system identification number assigned at the shipment of the system from the factory, the product identification number assigned to each portable telephone at the stage of product and a telephone identification number assigned at the site of installation. The stored information is retained in a nonvolatile manner to be used for establishing calls. A numeric keypad 109 is also connected to the controller 105 for generating a dialling signal.

Figure 3A:
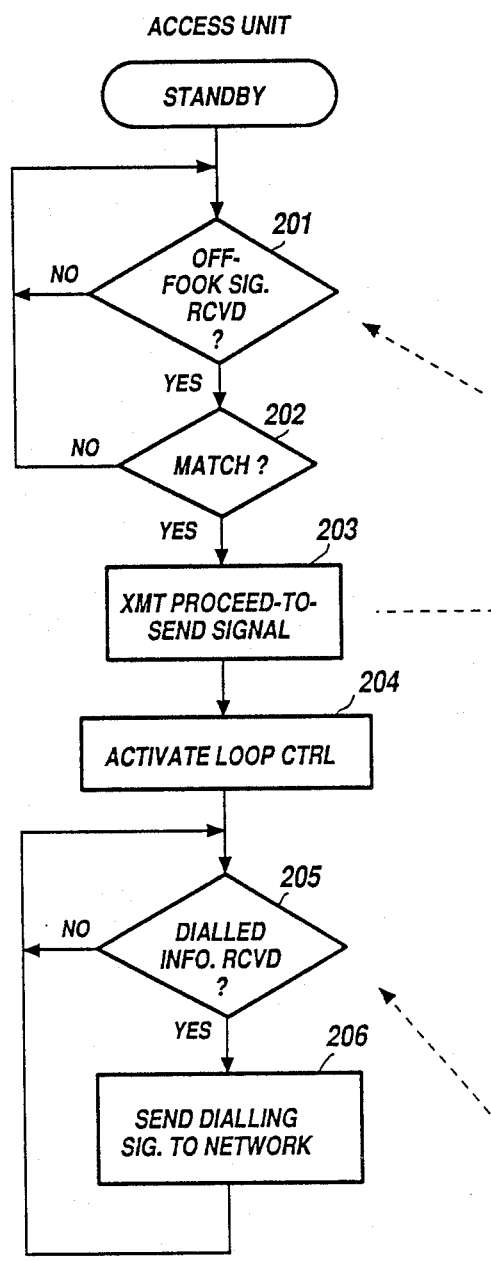
FIGS. 3a and 3b are flow diagrams of the access unit and each cordless telephone, respectively, when an outgoing call is originated from one of the cordless telephones.
Figure 3B:
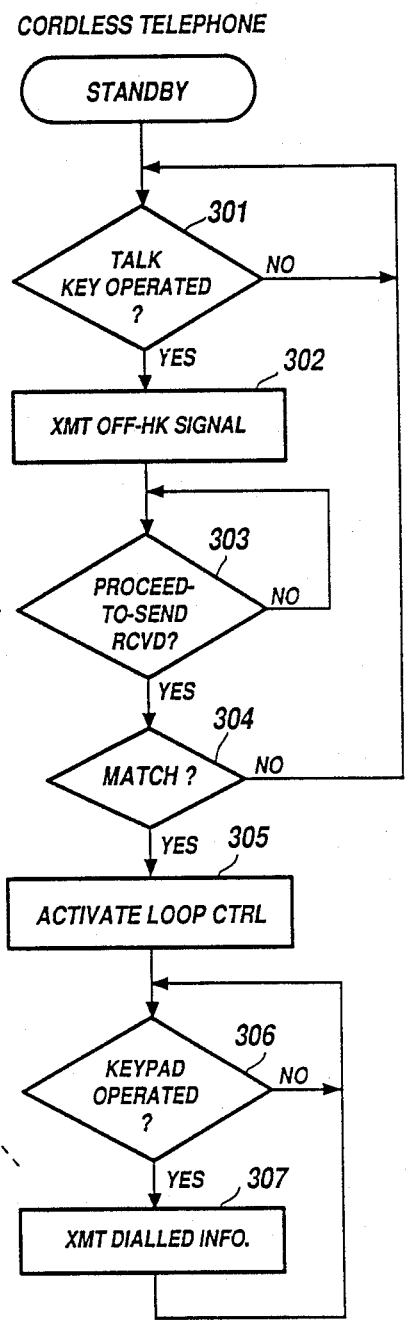

When originating an outgoing call, the user depresses the talk key 106. As specifically shown in FIGS. 3a and 3b, the controller 105 of a call-originating telephone 101 checks to see if the talk key 106 is depressed (step 301) and, if it is, controller 105 retrieves the system identification number from the memory 108 and sends it to the access unit 1 as an off-hook signal through the transmit/receive unit 102 (step 302). On receiving the off-hook signal from the cordless telephone (step 201), the controller 7 of access unit 1 compares it with the system identification number stored in memory 10. If they match (step 202), controller 7 returns the system identification number as a proceed-to-send signal (step 203) and activates the loop control circuit 5 (step 204) to form a DC loop across the subscriber line terminal. Dial tone from the telephone network can therefore be heard by the originating telephone.

On receiving the proceed-to-send signal (step 303), the controller 105 of the originating telephone reads the system identification number out of the memory 108 for comparison with the received system identification number. If they match (step 304), controller 105 activates the loop control circuit 103 (step 305) to connect the handset 104 to the transmit/receive unit 102 to receive the dial tone from the access unit 1 and connects the keypad 109 to the transmit/receive unit to allow the caller to operate the keypad 109 to send a dialling signal to the access unit 1 (steps 306 and 307). The dialled information is received by the access unit and relayed to the telephone network (steps 205 and 206).

Although not shown in detail, incoming calls are handled in a manner inverse to that shown above. Namely, when completing an incoming call from the access unit 1, a ringing signal is detected by the controller 105 and the tone ringer 107 is activated to urge the user to operate the talk key 106 for signalling answer of the call. Controller 105 responds to it by activating the loop control circuit 103 to couple the handset 104 to the transmit/receive unit 102 to establish a connection.

Figure 4A:
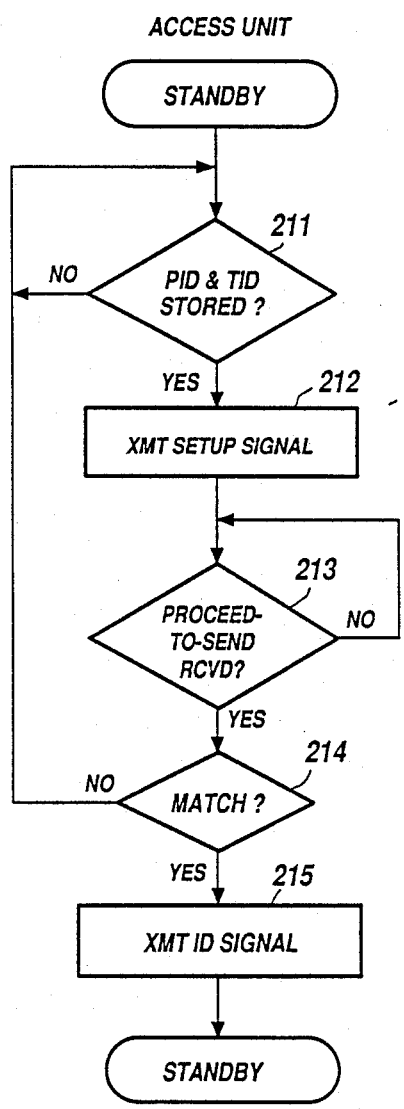
FIGS. 4a and 4b are flow diagrams of the access unit and a newly installed cordless telephone, respectively, illustrating a registration process.
Figure 4B:
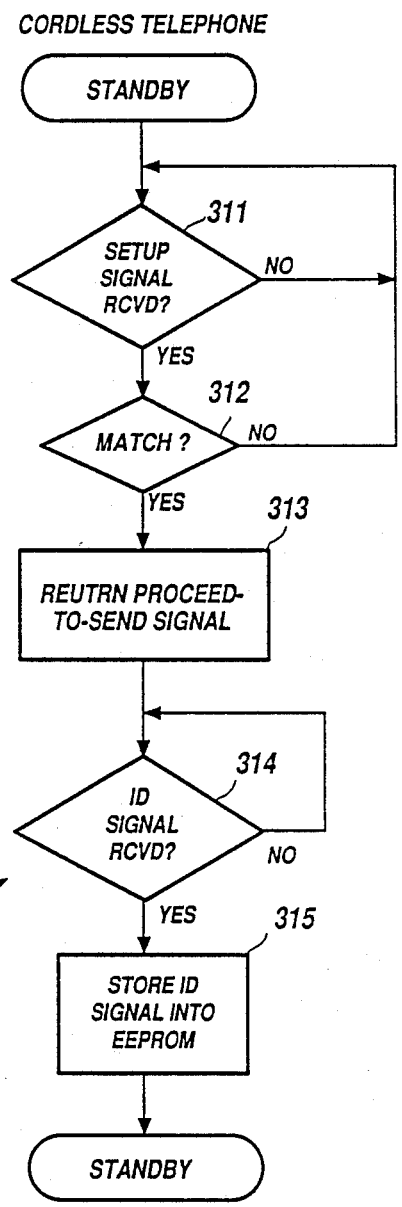

When installing a new cordless telephone, a servicing personnel first visits the site where it is installed and then visits the site of the access unit. The personnel enters the product identification number of the new telephone into a random access memory of the controller 7 of the access unit and assigns a unique telephone identification number and enters it into the RAM as shown in step 211 in FIG. 4a. Controller 7 then sends the product identification number to the new cordless telephone as a setup signal (step 212). On receiving the setup signal (step 311), controller 105 of the new cordless telephone checks whether the received product identification number coincides with one stored in the memory 108 (step 312). If they match, the controller 105 returns the product identification number stored in the memory 105 to the access unit as a proceed-to-send signal (step 313). On receiving this signal (step 213), the controller 7 checks whether the received product identification number coincides with the previously entered number to verify that the new cordless telephone has correctly received the setup signal (step 214). If coincidence occcurs, controller 7 reads the system identification number from the read-only memory 10 and the telephone identification number from the random access memory of the controller 7 and sends them as an ID registration signal to the new cordless telephone (step 215). On receiving the ID registration signal (step 314), controller 105 of the new cordless telephone stores the received system identification number and telephone identification number into the electrically erasable PROM 108 (step 315).

Figure 5A:
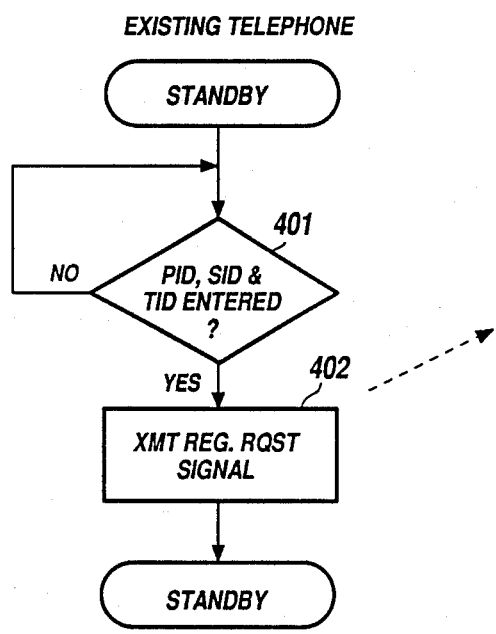
FIGS. 5a and 5b are flow diagrams of an existing cordless telephone and the access unit, respectively, illustrating a modified registration process.
Figure 5B:
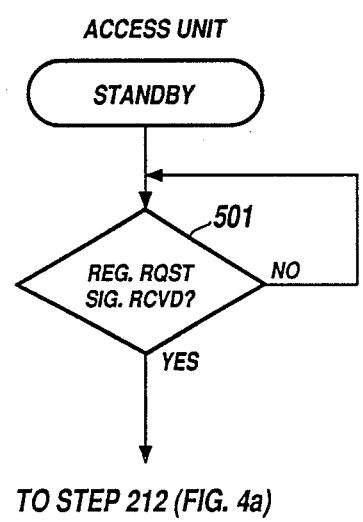

Instead of visiting the site of the access unit, the servicing personnel may visit the site of an existing cordless telephone to send a registration request signal to the access unit 1. As shown in FIGS. 5a and 5b, the servicing personnel first enters the product identification number of the new cordless telephone into a random access memory of the controller 105 of the existing telephone using its numeric keypad 109 and then enters the system identification number and a newly assigned telephone identification number (step 401). Controller 105 of the existing telephone now sends the entered numbers as a registration request signal to the access unit (step 402). On receiving the registration request signal (step 501), controller 7 of the access unit stores the received signal into the random access memory of the controller and proceeds to step 212 of FIG. 4a to transmit the product identification number to the new telephone as a setup signal.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A cordless telephone system having a unique system identification number assigned to it and a plurality of telephone identification numbers assigned respectively to a plurality of cordless telephones which establish respective two-way radio channels with an access unit, the access unit being connected to a subscriber line terminal of a switched telephone network, each of said cordless telephones having a uniquely assigned product identification number, comprising:

said access unit comprising means for transmitting said system identification number and the product and telephone identification numbers of one of said cordless telephones when same is to be registered to said system as a new telephone; and said one cordless telephone comprising a memory of the type which allows data to be electrically written therein and means for verifying whether said product identification number transmitted from said access unit is identical to the product identification number of said one cordless telephone and writing said system and telephone identification numbers transmitted from said access unit into said memory if said product identification number is verified.

2. A cordless telephone system as claimed in claim 1, further comprising means for transmitting the product and telephone identification numbers of said one cordless telephone from another cordless telephone of said system to said access unit, and wherein said access unit receives said product and telephone identification numbers from said another cordless telephone and transmits copies of the received numbers to said one cordless telephone when same is to be registered to said system as said new telephone.

3. A method as claimed in claim 1, wherein said memory is an electrically erasable programmable read-only memory.

4. A method for making a registration of a new cordless telephone to an existing cordless telephone system, said system comprising a plurality of existing cordless telephones and an existing access unit connected by way of respective two-way radio channels with said new and existing cordless telephones, said system having a unique system identification number and each of said cordless telephones having a unique product identification number and a telephone identification number, comprising the steps of:

(a) transmitting the product identification number of said new cordless telephone from said access unit to said new cordless telephone;

(b) receiving the transmitted product identification number at said new cordless telephone and verifying that the received number is identical to the product identification number assigned to said new cordless telephone;

(c) transmitting the system and telephone identification numbers of said new cordless telephone from said access unit in response to the verification of said received product identification number;

(d) receiving said transmitted system and telephone identification numbers at said new cordless telephone and storing the received numbers into a memory.

5. A method as claimed in claim 4, further comprising the step of transmitting said product and telephone identification numbers of said new cordless telephone from one of said existing cordless telephones to said access unit prior to the step (a).

6. A method as claimed in claim 4, wherein said memory is an electrically erasable programmable read-only memory.

* * * * *